Feb. 14, 1933.  M. A. WEST  1,897,542
TRANSMISSION SHAFT FOR VEHICLES
Filed April 27, 1929
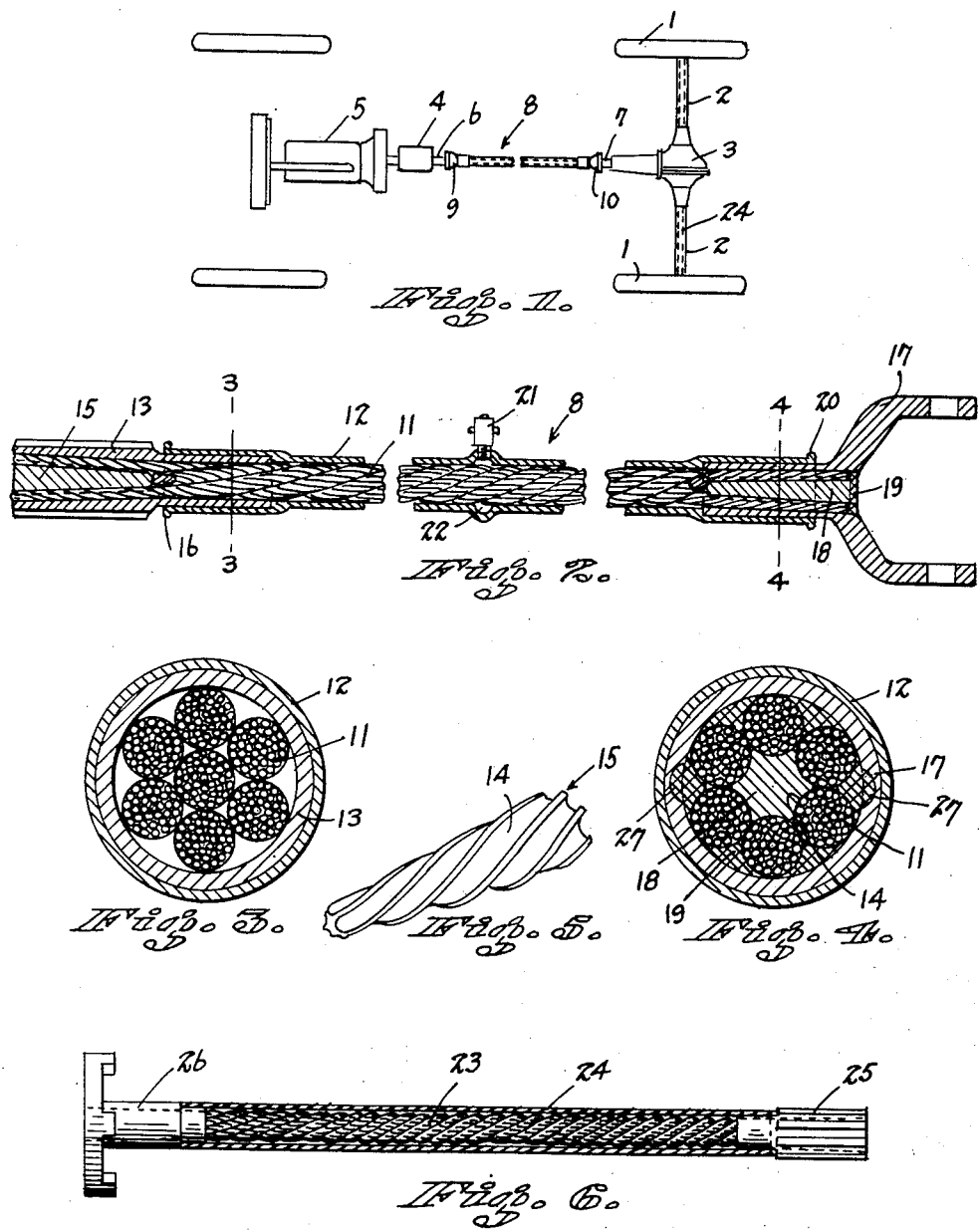
INVENTOR.
MAXWELL A. WEST
BY
ATTORNEYS.

Patented Feb. 14, 1933

1,897,542

UNITED STATES PATENT OFFICE

MAXWELL A. WEST, OF OAKLAND, CALIFORNIA

TRANSMISSION SHAFT FOR VEHICLES

Application filed April 27, 1929. Serial No. 358,598.

My invention relates to improvements in transmission shafts for vehicles, and it consists in the combinations, constructions and arrangements hereinafter described and claimed.

The standard practice is to connect a rigid propeller shaft to the rear wheels of an automobile by a differential or other like mechanism and then to connect the propeller shaft to and disconnect it from the engine by means of a clutch. The transmission, the propeller shaft, the differential, the rear axles, and the rear wheels are placed under undue strain each time the clutch suddenly connects these parts with the engine. It is obvious that this strain cuts down on the long life of the car and requires repairs to be made much sooner than should be the case.

Not only are the parts subjected to undue strain for the reason just set forth, but they are continually subjected to a strain when connected to the engine because there is a sudden shock at each explosion of the engine which is only partly absorbed by the flywheel, the rest being absorbed by the moving parts. This is especially destructive of tires and road surface.

The principal object of my invention is to provide a flexible propeller shaft that will permit a slight tortional movement to take place between its ends, this movement permitting a smoother connection between the rear wheels and their associate mechanism and the engine. The rear axles may be constructed in the same manner as the propeller shaft, and this will lengthen the life of the automobile. I do not wish to be confined to a rear wheel drive, because it is obvious that a shaft may extend to the front wheels and drive these wheels as well as the rear wheels.

A further object of my invention is to provide a device of the type described which has novel means for preventing any whip-like motion to be imparted to the flexible propeller shaft. Novel means is also provided for securing the ends of the flexible shaft to the universal joints.

Other objects and advantages will appear as the specification proceeds, and the novel features of my invention will be particularly pointed out in the appended claims.

My invention is illustrated in the accompanying drawing forming a part of this application, in which Figure 1 is a schematic view showing a flexible propeller shaft and flexible rear axles disposed in an automobile;

Figure 2 is a longitudinal section through the propeller shaft;

Figures 3 and 4 are sections along the lines 3—3 and 4—4 of Figure 2;

Figure 5 is a perspective view of a novel type of wedge; and

Figure 6 is a longitudinal section through one of the rear axles.

In carrying out my invention I make use of the standard parts of an automobile which include rear wheels 1, a rear axle housing 2, a differential 3, a transmission 4, including a clutch mechanism not shown, and an engine 5. The transmission shaft 6 is connected to the shaft 7 leading into the differential 3 by means of my flexible propeller shaft 8 now to be described. The shaft 8 is connected to the shafts 6 and 7 by universal joints 9 and 10.

The propeller shaft is shown in Figure 2. A flexible cable 11 of a strength capable of taking the place of the usual rigid propeller shaft, is placed within a housing 12. I have found that a steel cable one and one-half inches in diameter is strong enough to take the place of the standard propeller shaft. In Figure 3 I have shown a six-strand cable with a steel core, although it is obvious that the number of strands may be changed at will.

One end of the cable 11 is secured to a splined member 13 by placing the strands of the cable in spiral grooves 14 of a wedge-shaped member 15 (see Figure 5). The member 15 is screwed down into the member 13 and swedges the strands of the cable in the member 13. If desired, Babbitt zinc may be poured into the end of the wedge 15 for sealing the parts in place.

The splined member 13 is slipped into the universal joint 9 and permits a slight longitudinal movement between the cable 11 and the universal joint. The wedge 15 prevents any slippage between the cable and the member 13 in a longitudinal direction or in a rotational direction.

The sleeve 12 extends over a portion of the member 13 as shown in Figure 2 and has its end turned over as at 16.

The opposite end of the cable 11 is secured to one part 17 of the universal joint 10 by a wedge 18 similar to the wedge 15. Babbitt 19 seals the wedge in place. The sleeve 12 encloses a portion of the member 17 and has its end turned over as at 20.

It should be noted that the cable has a long lay and that the tendency of the engine 5 when propelling the car in a forward direction is to unwind the cable. Of course, the sleeve 12 prevents this unwinding yet at the same time a slight expansion of the cable will take place, and this will permit the member 13 to make a greater turn than the member 17. The result will be a more gentle connection between the differential 3 and the engine 5. The sleeve 12 not only prevents the cable 11 from unwinding, but also prevents any whip-like action taking place. The sleeve revolves with the cable.

The sleeve performs an additional function in that it acts as a housing for the cable, keeping out foreign material, and holds a lubricant in contact with the cable. An oil cup 21 is disposed midway between the ends of the sleeve 12 and feeds oil into an annular groove 22 under pressure. This oil will penetrate the entire cable and will increase its life.

In Figure 6 I show a rear axle employing the same principle as that set forth for the propeller shaft. A cable 23 similar to the cable 11 is housed within a sleeve 24 and is connected to a splined member 25 and to a member 26 that in turn is connected to one of the rear wheels 1. The sleeve 24 is disposed within the axle housing 2 (see Figure 1). A driving movement imparted to the splined member 25 by the differential 3 will be transmitted by the cable 23 to the member 26 in such a way as to tend to cause the cable to unwind. This will permit the member 25 to move through a greater distance than the member 26 during the start. The spline 25 is connected to the differential and permits a slight longitudinal movement to take place.

From the foregoing description of the various parts of the device, the operation thereof may be readily understood.

The automobile will operate in the usual manner, and the propeller shaft 8 and the rear axles 23 will connect the rear wheels 1 to the engine, but will cause a more gentle connection to take place than is now the practice. The cables 11 and 23 will resume their normal shape when the vehicle is at rest, and in this way there will always be a slight give between the rear wheels and the engine 5 when the car is started. The life of the car will be materially increased because of this construction.

The members 13 and 17 covering the ends of the cable are provided with grooves 27 (see Figure 4) that receive the zinc or babbitt 19. The zinc also flows around the cable strands. In this way the cable is prevented from rotating freely within the members.

Although I have shown and described one embodiment of my invention, it is to be understood that the same is susceptible of various changes, and I reserve the right to employ such changes as may come within the scope of the invention as claimed.

I claim:

1. A flexible transmission shaft comprising a cable, driving and driven members secured to the two ends of the cable, spirally grooved conical-shaped wedges for rigidly securing the ends of the cable to the members, said grooves receiving the separate strands of the cable and a sleeve enclosing the cable and rotating therewith.

2. A flexible transmission shaft comprising a cable, driving and driven members secured to the two ends of the cable, spirally grooved conical-shaped wedges for rigidly securing the ends of the cable to the members, said grooves receiving the separate strands of the cable, a babbitt securing the wedges, cable and members to each other and a sleeve enclosing the cable and rotating therewith.

3. A flexible transmission shaft comprising a cable formed with a plurality of strands, driving and driven members secured to the ends of the cable, and a casing enclosing and embracing the cable and floating on portions of the driving and driven members for permitting a slight twisting of the cable, said casing preventing any cable whip.

4. A flexible transmission shaft comprising a cable formed with a plurality of strands, driving and driven members secured to the ends of the cable, a casing enclosing and embracing the cable and floating on portions of the driving and driven members for permitting a slight twisting of the cable, said casing preventing any cable whip, and a lubricant feeding means for the casing for feeding a lubricant into the casing and in contact with the wires forming the strands of the cable.

5. A transmission shaft comprising a flexible cable formed with a plurality of strands, one end of the cable having a slight tortional movement relative to the other end when a rotative force is applied to the first end, a sleeve snugly engaging the cable throughout the length of the latter, and oiling means carried by said sleeve for conveying a lubricant to said cable.

6. A transmission shaft comprising a cable formed with a plurality of strands, a tubular sleeve housing and embracing the cable and being rotatable therewith, said sleeve preventing the unraveling of the cable and also preventing any whip-like motion taking place in the cable.

MAXWELL A. WEST.